June 2, 1959   B. R. BETTER ET AL   2,889,022
DOUBLE ROLLER TORQUE DRIVER

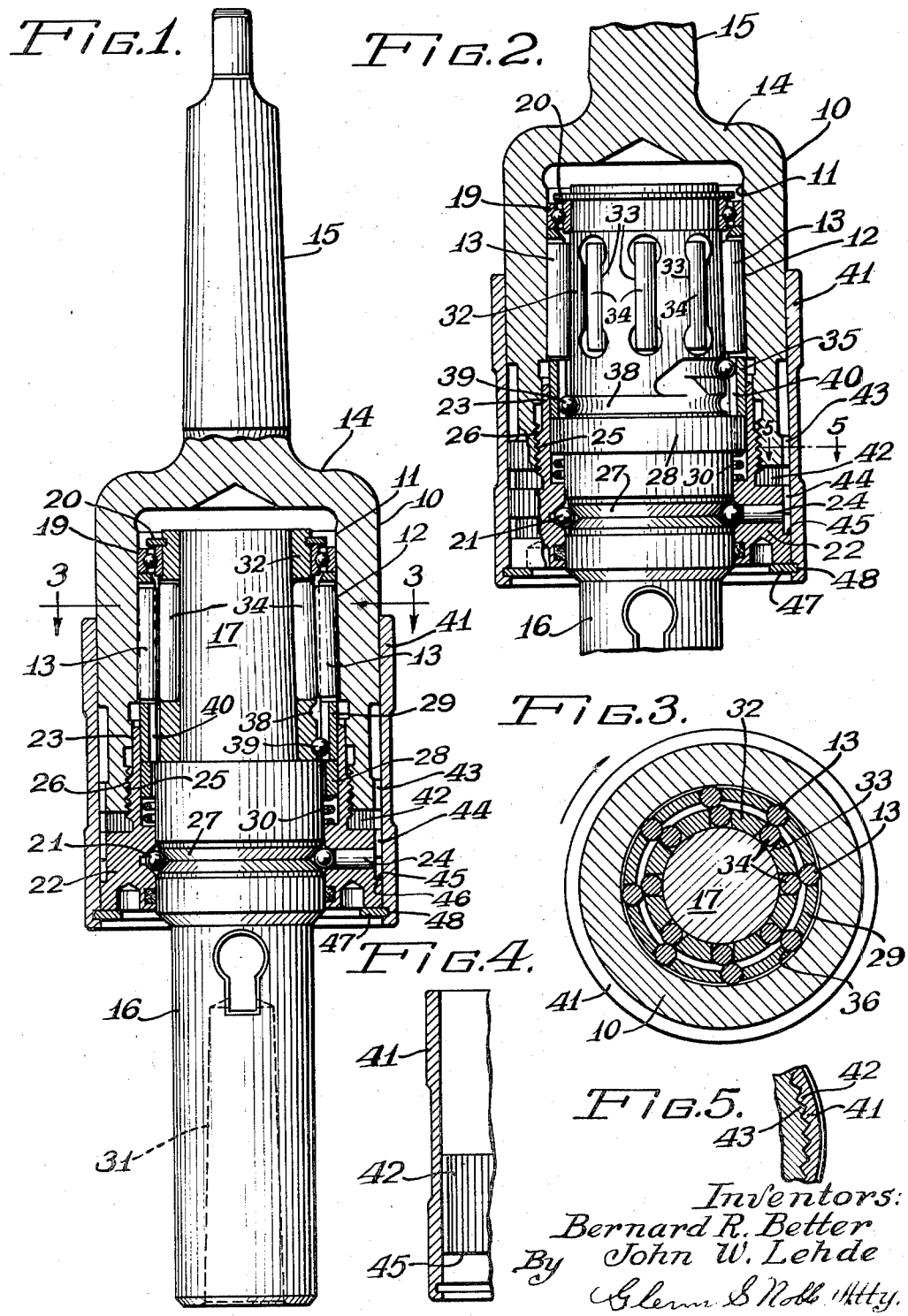

Filed July 13, 1955   2 Sheets-Sheet 2

Inventors:
Bernard R. Better
John W. Lehde
By Glenn S. Noble Atty.

2,889,022

DOUBLE ROLLER TORQUE DRIVER

Bernard R. Better and John W. Lehde, Jr., Chicago, Ill., assignors to Scully-Jones and Company, Chicago, Ill., a corporation of Illinois Application July 13, 1955, Serial No. 521,675

6 Claims. (Cl. 192—56)

This invention provides means for driving various tools such as commonly used in connection with machine tools such as drills or the like, and is particularly adapted for use in tapping operations. It is in the nature of a safe torque device in that after the resistance to the driver reaches a predetermined value, the driver will automatically cease driving and move into a free-wheeling position. Heretofore somewhat similar driving devices have been used in which the driven members are provided with driving cams or ridges which coact with the rollers actuated by the driving member.

The present invention will have longer lives than the prior cam driven devices and is much simpler in order to manufacture the same. The device is also more economical in maintenance as will be apparent from the description of the same.

In the accompanying drawings illustrating this invention,

Fig. 1 is a longitudinal sectional view of a preferred form of our driver.

Fig. 2 is a view somewhat similar to Fig. 1 but showing the driving cage and rollers and also illustrating safety ball arrangement and resetting operation.

Fig. 3 is a sectional view taken substantially on the line 3—3 of Fig. 1.

Figs. 4 and 5 are details of the adjusting sleeve arrangement.

Figure 6:
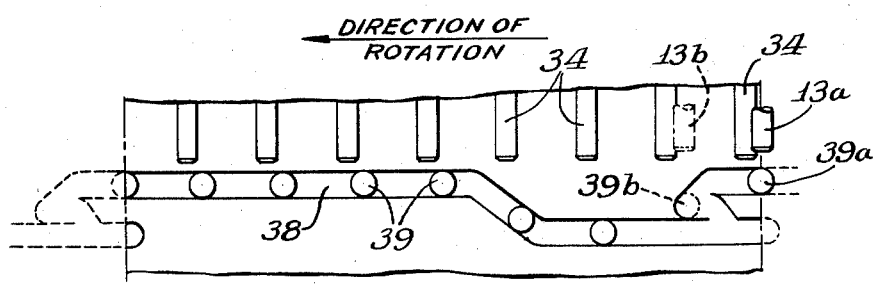
Figs. 6, 7 and 8 are diagrammatic views illustrating the means for holding the driven member in free wheeling position and also for resetting the device.

In a particular form of the invention as shown in the drawings, 10 is an integral cup-shaped or substantially cylindrical driving member formed of resilient metal so that it is adapted to be distorted under excessive pressure and will then return to normal position during the operation of the driver. The central bore 11 is tapered or conical shape as shown at 12 for engagement with the outer series of driving rollers 13. One end of the driving member is closed as shown at 14 and is provided with a tang 15 or other suitable means for connection with the machine tool or drill press used for actuating the same.

The driven member 16 is rotatably and axially mounted in the driving member as shown particularly in Fig. 1. The driven member has a conical section 17 which is tapered toward its inner end and which engages with the rollers 34 to provide an inner set of driving members. The inner end of the driven member is mounted in a ball bearing 19 which is held in position by a retaining ring 20. The driven member has a second ball bearing 21 in the enlarged portion 22 of a sleeve 23. The balls are held in the ball race by a plug 24. The sleeve 23 is mounted in the end of the driving member 10 and is provided with threads 25 which engage with threads 26 in the end of the driving member, the arrangement being such that the sleeve will have longitudinal or axial movement with respect to the driving member for the purpose of adjusting the tapered portion of the driven member with respect to the tapered portion of the driving member. The balls 21 engage with the ball race 27 in the driven member 16, the arrangement being such that when the sleeve 23 is adjusted by means of the threaded arrangement, it will carry the driven member therewith.

The bore of the sleeve 23 is somewhat larger than the adjacent portion of the driven member and provides space for a ring 28 of oilite or similar material which will move freely in its space. This ring is biased toward the roller cage 29 by means of a spring 30 which engages with a shoulder at the end of the enlarged portion of the sleeve. This ring and spring serve to provide the desired amount of friction on the cage in order to insure the proper turning of the cage at times as will be described hereinafter.

The driven member 16 is provided at its outer end with suitable means for attachment to the tap or tool to be driven as for instance, the socket 31.

The tapered portion of the driven member is provided with a roller cage 32 which has a proper fit on the driven member and is suitably fastened thereto. By this means, the cage is prevented from rotating or moving axially with respect to the driven member. The cage is provided with a plurality of axially extending slots 33 to receive rollers 34. The ball bearing 19 is positioned between the roller cage and the driving member as shown in Fig. 1.

A second roller unit comprising a cage 29 having radial slots 36 for the rollers 13 is interposed between the first roller unit and the tapered portion of the driving member as shown.

The end of the roller cage 32 is provided with a reset ball track 38 for cooperating with reset balls 39 which are mounted in longitudinal slots 40 in the end of the cage 35. There is one of these slots and balls in substantial alignment with each of these rollers 13. These balls cannot change the angular position with respect to each other, but are free to move in axial direction in said slots, thus enabling them to follow the path of the reset ball track 38.

In order to hold the members in adjusted positions, we provide a cylindrical shell 41 which fits freely over the driven member and the enlarged end of the sleeve 23. This sleeve is provided with teeth 42 which are long enough to engage with similar teeth 43 on the driven member and with teeth 44 on the enlarged portion of the sleeve 23. The sleeve has an inner shoulder 45 which engages with a similar shoulder 46 on the enlarged portion of the collar and is held in operative position by means of a retaining ring 47 which engages with a peripheral slot 48 in the sleeve.

The distance between the outer diameter of the tapered portion of the driven member and the inner diameter of the driving member is less than the combined diameters of a pair of rollers 13 and 34, and as a consequence, the outer rollers will impinge upon the inner periphery of the driving member and serve to act as a roller clutch to turn the driven member.

The outermost rollers engage with the innermost rollers when the driving member is rotated in a clockwise direction as shown in Fig. 3 and the driven member is retarded as occurs when the tap engages with a hole to be tapped. When the resistance set up by the tap or tool which is being driven reaches a predetermined maximum value, the outermost rollers will deform the shell of the driving member sufficiently to allow them to pass over the inner rollers. There may also be deformation of the rollers and other parts during this over-riding movement. When this over-riding occurs, the outer rollers will be held against further movement with respect to the inner rollers by the reset balls and ball track. This is accomplished by the movement shown in Figs. 6–8.

Fig. 6 illustrates the position of the groups of rollers and reset balls controlling the cycle when the tool is ready to be driven. With the driving member rotated in clockwise direction and the driven member being retarded by an externally applied resisting torque such as provided by the tap, the friction ring 28 and coacting parts between the adjusting sleeve 23 and the roller cages 35 will cause the cage to be rotated with respect to the inner roller units until the rollers 34 impinge on the wall of the driving member and with sufficient force to act against the inner set of rollers and turn the driven member. The ball 39a and roller 13a show the positions at the beginning of the cycle. As the driving member continues to turn, the outer set of rollers will become wedged between the rollers of the inner unit and the adjacent wall of the driving member thus forming a positive driving connection through which torque is transmitted to the driven member in a manner similar to a roller clutch.

Figure 9:
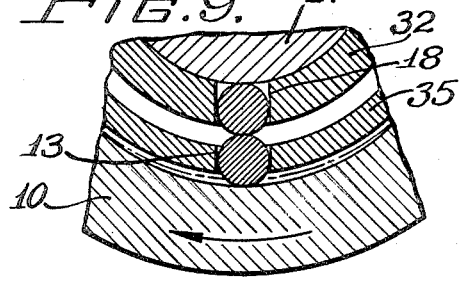
Fig. 9 is an enlarged sectional view illustrating the position of the parts when the driven member has been subjected to excessive resistance and the driving member is passing from driving position to release or free wheeling position.

When the resistance of the driven member becomes excessive as when a tap reaches the bottom of a hole, the driving member will cause the outer rollers to pass up over the inner rollers 34 and during this movement will cause deformation of the driving member as indicated in Fig. 9. As soon as the outer rollers have passed beyond the inner rollers, they no longer serve to drive and the driven member is in free wheeling position. The extent of the deformation or stretching of the parts will depend in part on the character of the metal in the various coacting members and also the thickness of the walls of the driving member.

Figure 7:
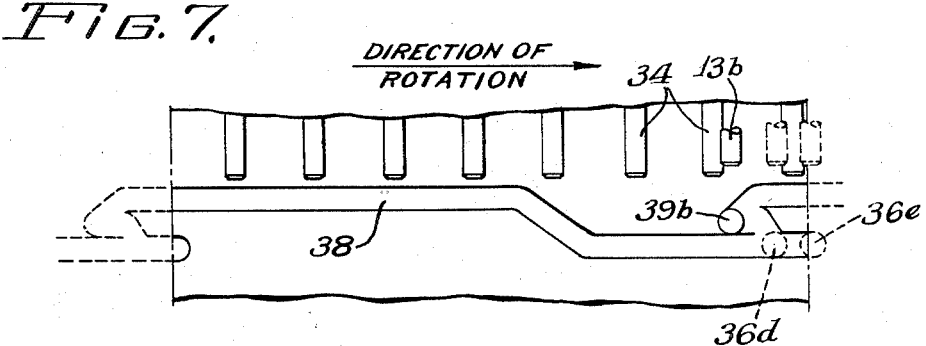

In some instances, the deformation of the driving member is so slight that it is not transmitted to the outside diameter but is confined to the immediate vicinity of the roller contact areas and no appreciable deformation of the surface of the shell or driving member can be noticed. When the rollers are in the free wheeling position, no driving force is exerted on the driven member but the driving member is free to continue turning without noise or effort. The rollers are held in such free wheeling position by one of the reset balls 39 which has entered the blind portion of the ball race as shown in dotted lines at 39b. The driver will deliver no further torque as long as the rollers and reset ball are in the positions 13b and 39b respectively as shown in Fig. 7.

When the rotation of the tool is reversed as for removing a tap, the rollers will be moved in the opposite direction and the reset ball controlling the cycle will be moved from position 39b to 36d by the action of the friction coupling against the outer roller cage.

The same roller wedging action occurs in this reverse direction as occurred in the former driving direction and the torque will be transmitted by the driver. If the external resisting torque in the reverse direction is increased to an amount equal to or greater than that causing releasing of the tool in the former direction, the rollers 13 will again ride over the high points provided by the inner rollers 34 with consequent deformation of the driving member and the rollers will again be held by the action of the reset ball in the blind portion of the track at positions 36e and the tool will be free wheeling in the reverse direction.

Figure 8:
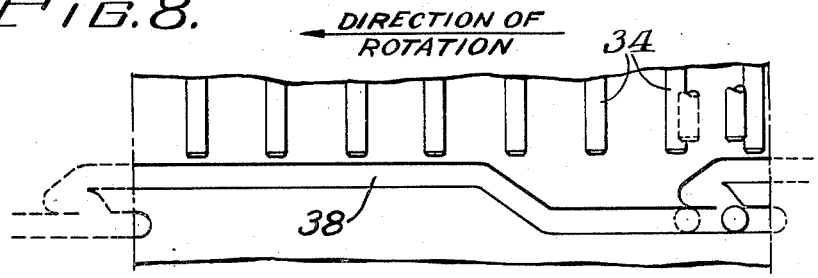

If over-riding does not occur in reverse, then when the driver is again rotated in forward direction, the rollers and reset ball will be moved to positions shown in Fig. 8, and the next reset ball in line will be moved into position as shown in Fig. 8 to control the next cycle. However, if over-riding does occur in reverse, then in order to move the rollers and reset balls to new operative positions, the tool must be over-ridden in the forward direction. This may be done manually during the succeeding operation after which the tool will be in ready position as shown in Fig. 6.

Our improved safe torque driver provides means for driving various tools and means for releasing and reversing driving and resetting as above described. Variation of the driving force or torque is accomplished by axial movement of the driven member with respect to the driving member which is accomplished by turning the sleeve 23 in the desired direction. Such movement of the driven member increases or decreases the radial distances between the tapered portions of the driving and driven members thereby creating more or less pressure on the driving rollers as they wedge between the inner group of rollers and the tapered portion of the driving shell.

It will be noted that the function of the reset balls which coact with the groove means is to lock the cage to the driven member during the free wheeling phases of operation so that when the rollers are released due to overload, they will be held in released or free wheeling position regardless of the continuous rotation of the driving member until the device is re-cycled which requires reversal of rotation of the driving shaft.

Having thus described our invention, what we claim is:

1. A torque driver for the purposes set forth having a resilient driving shell, means for attaching the shell to a machine tool for turning the same, said shell having a tapered bore, a driven member mounted in the shell and having a tapered portion, a roller cage secured to the tapered portion, rollers mounted in slots in said cage, a second roller cage between the first named cage and the driving shell, rollers mounted in slots in said second named cage and engaging with the first named rollers and the tapered portion of the driving shell, the combined diameters of a pair of the first named and second named rollers being greater than the distance between the tapered portion of the driven member and the tapered portion of the driving shell, the arrangement being such that the driving shell and pairs of rollers will act as a roller clutch to drive the driven member and when the driven member presents too much resistance, the second named rollers will ride over the first named rollers and deform the driving member and move into non-driving positions, and means for holding the cages with the rollers in non-driving position after such over-riding and permitting free wheeling of the driving shell.

2. In a torque driver, the combination of a cylindrical resilient driving member having a bore therein, a driven member mounted in the bore of the driving member, a roller cage fixed to the driven member, rollers mounted in slots in said cage, a second roller cage rotatably mounted in the driving member, rollers in slots in the second named cage which engage with the first named rollers to provide driving pairs, the distance between the roller race on the driving member and the roller race on the driven member being less than the combined diameters of a pair of said rollers whereby the pairs of rollers will act to drive the driven member until it presents undue resistance and thereupon the rollers in the outer unit will ride over the inner rollers with consequent deformation of the driving member.

3. In a safe torque driver for driving taps, the combination of a resilient driving shell, a driven member rotatably mounted in the driving shell, a roller cage securely fixed to the driven member, rollers mounted in said cage, a second roller cage between the first named cage and the inner wall of the driving shell, rollers mounted in the second cage which will be impinged upon by the driving member and will coact with the first named rollers for turning the driven member, the distance between the roller race on the driving member and the roller race on the driven member being less than the combined diameters of a pair of said rollers said last named rollers being adapted to pass over the first named rollers when resistance becomes excessive and to distort the driving shell as they pass over and into free wheeling positions, and means coacting with the driving and driven members for holding the last named rollers in such free wheeling positions.

4. In a torque driver, the combination of an integrally formed resilient metallic cylindrical driving member having a tapered bore, a driven member mounted in operative position in the driving member and having a tapered portion opposed to the tapered portion of the driving member, a roller cage secured to the tapered portion of the driven member, said cage having axially extending slots, rollers mounted in said slots, a roller cage in the tapered portion of the driving member, rollers mounted in said cage for engagement with the first named rollers and the tapered portion of the driving member, the combined diameters of a pair of the first named and second named rollers being greater than the distance between the tapered portion of the driven member and the tapered portion of the driving member whereby the rollers in the driving member will act through the rollers on the driven member to drive the driven member, the arrangement being such that when the driven member presents too much resistance, the second named rollers will ride over the first named rollers and deform the driving member and move into non-driving position, and means for adjusting the driven member and parts connected therewith longitudinally with respect to the driving member to increase or decrease the driving torque.

5. A roller torque driving member having in combination a shell-like cylindrical driving member formed of elastic metal, a driven member rotatably mounted in the driving member, a series of driving rollers positioned around the driven member and adapted to turn the same, means for holding said rollers against circumferential movement with respect to the driven member, a second series of driving rollers mounted between the rollers of the first series and the inner wall of the driving member, the distance between the driving portion of the driven member and the inner wall of the driving member being less than the combined diameters of a pair of said rollers a cage for said second series of rollers, the rollers of the first named series being so proportioned to the rollers of the second named series that in normal operation, the driven member may be driven by said rollers but if the torque exceeds a predetermined amount, the rollers of the second named series will ride over the rollers of the first named series and into free wheeling position.

6. In a device of the character set forth, the combination of a cylindrical driving member having a tapered central bore and formed of resilient material whereby it is adapted to be distorted under excessive pressure and will then return to normal position during the operation of the driver, means for attaching the driving member to a machine tool for driving the same, a driven member rotatably mounted in the driving member and having a tapered portion opposed to the tapered portion of the tapered bore of the driving member, a roller cage having slots therein and secured to the driven member, rollers mounted in said slots, a second roller cage between the first named cage and the tapered bore of the driving member and having longitudinal slots therein, rollers mounted in the slots of the second cage, the distance between the wall of the bore of the driving member and the roller race on the driven member being less than the combined diameters of a pair of said rollers whereby the rollers of the second named cage coacting with the rollers in the first named cage for turning the driven member, a tortuous circumferential reset ball track in one end of the first named cage, longitudinal slots in the second named cage adjacent to the ball track, balls in said slots which are adapted to move longitudinally therein and which extend inwardly to engage at times with the reset ball track to follow the ball track which track is shaped so that it will hold the cages in certain fixed positions as described, and means for adjusting the driven member longitudinally with respect to the driving member.

References Cited in the file of this patent

UNITED STATES PATENTS

| | | |
|---|---|---|
| 2,250,736 | Torresen | July 29, 1941 |
| 2,441,038 | Siesel | May 4, 1948 |
| 2,576,069 | Hoag et al. | Nov. 20, 1951 |
| 2,668,426 | Hoover | Feb. 9, 1954 |
| 2,683,362 | Bowman | July 13, 1954 |

FOREIGN PATENTS

| | | |
|---|---|---|
| 701,041 | Germany | Jan. 7, 1941 |